US012793472B2

(12) United States Patent
Crewse et al.

(10) Patent No.: US 12,793,472 B2
(45) Date of Patent: Nov. 10, 2026

(54) SYSTEM FOR CONTROLLING VEHICLE PERFORMANCE ATTRIBUTES

(71) Applicant: Super73, Inc., Irvine, CA (US)

(72) Inventors: Legrand Crewse, Irvine, CA (US); Jose Pfondevida, Irvine, CA (US)

(73) Assignee: Super 73, Inc., San Clemente, CA (US)

( * ) Notice: Subject to any disclaimer, the term of this patent is extended or adjusted under 35 U.S.C. 154(b) by 245 days.

(21) Appl. No.: 17/145,859

(22) Filed: Jan. 11, 2021

(65) Prior Publication Data

US 2022/0222979 A1 Jul. 14, 2022

(51) Int. Cl.

*G07C 5/00* (2006.01)
*B60W 20/13* (2016.01)
*G07C 5/08* (2006.01)

(52) U.S. Cl.

CPC ............. *G07C 5/008* (2013.01); *B60W 20/13* (2016.01); *G07C 5/0816* (2013.01); *G07C 5/0841* (2013.01); *B60W 2300/36* (2013.01)

(58) Field of Classification Search

None
See application file for complete search history.

(56) References Cited

U.S. PATENT DOCUMENTS 8,876,657 B1 * 11/2014 Behbehani ............. B62M 11/16 180/206.6
9,656,672 B2 * 5/2017 Schieffelin ............. B60W 10/11
2012/0080249 A1 4/2012 Yates, III et al.
2014/0365059 A1 * 12/2014 Keilers ............... B60W 30/188 701/22
2016/0014252 A1 * 1/2016 Biderman ................ A61G 5/04 701/29.2
2016/0159431 A1 * 6/2016 Hayslett .................... B62M 6/70 180/206.3
2019/0381957 A1 † 12/2019 Umoh

FOREIGN PATENT DOCUMENTS

KR 101073476 B1 † 10/2011

OTHER PUBLICATIONS

Changing Max Speed Limit on Levy Electric Scooter, Levy Electric https://www.youtube.com/watch?v=sQxoPhCcMSc (Year: 2020).* https://www.youtube.com/watch?v=sQxoPhCcMSc Oct. 2, 2020.

* cited by examiner
† cited by third party

*Primary Examiner* — Imran K Mustafa
*Assistant Examiner* — David Hatch
(74) *Attorney, Agent, or Firm* — Stradling Yocca Carlson & Rauth

(57) ABSTRACT

A vehicle is provided, including a receiver configured to receive a vehicle performance alteration command from a computing device, a controller configured to receive the vehicle performance alteration command from the receiver and provide a performance altering command, a power source configured to receive the performance altering command from the controller, and an electrically driven hardware element configured to receive electrical power from the power source. The controller is configured to alter operation of the power source to effectuate vehicle performance in accordance with the vehicle performance alteration command.

20 Claims, 5 Drawing Sheets

SYSTEM FOR CONTROLLING VEHICLE PERFORMANCE ATTRIBUTES

BACKGROUND OF THE INVENTION

Field of the Invention

The present invention relates generally to controlling a performance attribute of a vehicle, such as vehicle speed, and more specifically to systems for user control of available performance attributes of vehicles such as electric motorbikes.

Description of the Related Art

Vehicles such as motorized bicycles have been around for decades. Devices such as mopeds offer an ability to pedal as well as operate the vehicle under power. Mopeds have historically employed small engines powered by gasoline. Newer devices, called electric motorbikes, employ electronic power in the form of a battery and can also be operated using a set of pedals in many instances.

However, certain jurisdictions and situations dictate that speeds of electric motorbike and vehicles of similar classes be maintained within certain limits. Some governmental agencies have stepped in and required maximum speed limits at which such vehicles are to operate. Exceeding these speed limits can be illegal. Different governmental and even private entities have mandated different operational restrictions for powered vehicles such as electric motorbikes, with more entities potentially requiring mandatory speed limits for such devices as time goes on.

The issue for owners and manufacturers of such devices is the ability for a particular vehicle to operate in accordance with the desires of the operator as well as according to the jurisdiction where it is operated, sold, and/or located. As may be appreciated, an electric motorbike may be manufactured somewhere in the world and may be shipped to almost any location. The purchaser may purchase the electric motorbike in a first jurisdiction wherein speeds are limited by law to 25 miles per hour. The purchaser may subsequently operate that electric motorbike in a second jurisdiction where the speed limit is 20 miles per hour for such a device. The purchaser may then sell the electric motorbike to a subsequent purchaser who maintains and operates the electric motorbike in a third jurisdiction with unlimited speed limits.

Historically, such a vehicle might be manufactured to adhere to the most restrictive speed limit anywhere. This is undesirable to a purchaser who, for example, lives in a jurisdiction where allowable speeds are higher than the most restrictive speed limit or are unlimited. Alternately, such vehicles could be manufactured for certain jurisdictions, i.e. making electric motorbikes that do not exceed limit P, other electric motorbikes of the same model that do not exceed limit Q, and still others of the same model that do not exceed speed limit R. This requires additional manufacturing efforts and inventory space, both of which are undesirable. Manufacturers could wait for orders to come in before constructing an electric motorbike that is desired not to exceed speed limit Q due to governmental restrictions in jurisdiction QQ, but that delays shipment and receipt by the purchaser, which is again undesirable. And again, in any of these scenarios, if the electric motorbike is manufactured and sold to a user in Ohio, built to Ohio speed limit requirements, and the user takes that electric motorbike to Michigan where the speed limit is different, in the past nothing could have been done.

The electric motorbike would have been operational according to Ohio laws only, and the operator of such a vehicle in Michigan could have been subject to criminal or civil penalties if Michigan had a more restrictive speed requirement.

Further, vehicles such as electric motorbikes have requirements regarding labeling, wherein a label must be provided listing certain attributes of the vehicle. If a vehicle performs at, for example, G miles per hour maximum, certain jurisdictions require a label on the vehicle indicating the G miles per hour maximum speed. In any electric motorbike that offers an ability to change performance attributes, a problem exists in that the labeling may not match the performance attribute.

It would be desirable to offer a vehicle that can change operational attributes, such as speed limit, according to laws of the jurisdiction where the vehicle is being operated at any given time. Further, it would be beneficial to offer a design wherein a vehicle such as an electric motorbike can be safely and legally operated in any jurisdiction that overcomes past issues with selling and purchasing such vehicles, with accurate labeling for the performance offered by the vehicle.

SUMMARY OF THE INVENTION

According to one embodiment, there is provided a vehicle system comprising a computing device configured to transmit a vehicle performance alteration command and a vehicle, comprising a receiver configured to receive the vehicle performance alteration command and a controller configured to receive the vehicle performance alteration command from the receiver and alter at least one electrical performance attribute of one electrically powered hardware component provided with the vehicle to cause the vehicle to perform in accordance with the vehicle performance alteration command.

According to another embodiment, there is provided a vehicle comprising a receiver configured to receive a vehicle performance alteration command from a computing device, a controller configured to receive the vehicle performance alteration command from the receiver and provide a performance altering command, a power source configured to receive the performance altering command from the controller, and an electrically driven hardware element configured to receive electrical power from the power source. The controller is configured to alter operation of the power source to effectuate vehicle performance in accordance with the vehicle performance alteration command.

According to a further embodiment, there is provided a vehicle comprising a receiver configured to receive a vehicle performance alteration command, a controller configured to receive the vehicle performance alteration command from the receiver and provide a performance altering command, a power source configured to receive the performance altering command from the controller, and an electrically driven hardware element configured to receive electrical power from the power source. The controller is configured to alter operation of the power source to alter a maximum level of vehicle performance in accordance with the vehicle performance alteration command.

These and other advantages of the present invention will become apparent to those skilled in the art from the following detailed description of the invention and the accompanying drawings.

BRIEF DESCRIPTION OF THE DRAWINGS

For a more complete understanding of the present disclosure, reference is now made to the following figures, wherein like reference numbers refer to similar items throughout the figures.

DETAILED DESCRIPTION

The following description and the drawings illustrate specific embodiments sufficiently to enable those skilled in the art to practice the system and method described. Other embodiments may incorporate structural, logical, process and other changes. Examples merely typify possible variations. Individual elements and functions are generally optional unless explicitly required, and the sequence of operations may vary. Portions and features of some embodiments may be included in, or substituted for, those of others.

The present design includes hardware that provides for the alteration of speed limits, or other performance attributes, to address or conform to local rules or performance restrictions established by various entities. The present design typically offers people with a remote computing device, such as an enabled smartphone, to transmit a request for performance changes over an available or appropriate communication channel. The vehicle includes a receiver for receiving communications over the communication channel and security may be provided for such communications. A user of the computing device may request a change from one performance attribute to another, such as one mode of performance to another mode of performance, and the vehicle receiver receives that communication. The receiver may provide the communication to the controller, which then issues commands to effectuate the commanded performance attribute change. Different performance attributes may be added to both the computing device and the controller as necessary, such as to the vehicle controller via a software or firmware update.

In another aspect of the present design, there is provided an electronic sign or signage that changes whenever the class, mode, or relevant performance attribute changes. Again, a user may issue a command to alter a specific performance attribute. The vehicle receiver may receive the command and may provide the command to the controller on the vehicle. The controller may, for example, command battery performance to limit speed of the vehicle in accordance with the commanded maximum speed value. Additionally, the controller may determine whether alternate signage is required due to the performance attribute change commanded and may provide a signal to a sign element, or display element, conveying the performance attribute change. For example, if a switch to Mode 3 is commanded, and a jurisdiction requires signage indicating Mode 3 performance, such as maximum speed of the vehicle, for display on the electronic signage provided. In one embodiment, a speed indicator may be provided proximate the center of the handlebars of the electronic motorbike, and the Mode, Class, or performance attribute may be indicated as well as any necessary information to convey performance information required in a jurisdiction.

Figure 1:
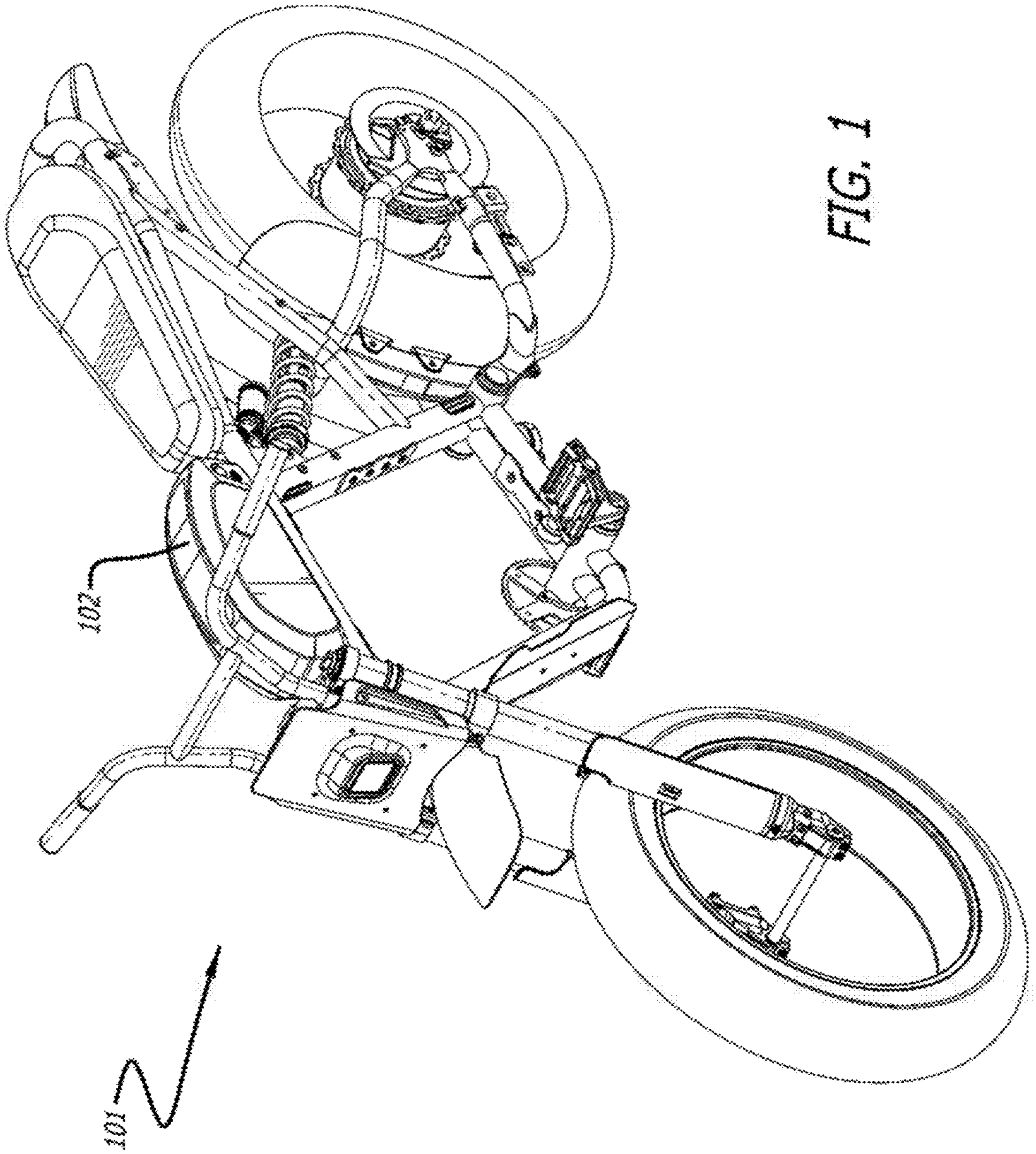
FIG. 1 illustrates a vehicle, specifically an electric motorbike, used in accordance with the present design.

FIG. 1 illustrates one version of a vehicle that may be employed in accordance with the present design. FIG. 1 shows electric motorbike 101 with a battery contained in battery compartment 102. Also provided with the electric motorbike 101 is a controller, which may be provided in battery compartment 102 or elsewhere. Other types of vehicles may be employed with the present design.

In one representation, the present design seeks to limit the maximum velocity at which the electric motorbike can travel on a flat road, for example. Local restrictions may indicate, for example, a maximum speed of 25 miles per hour, 15 miles per hour, or unlimited, and/or some other appropriate velocity. Such regulations may be promulgated by a government entity, such as a local, city, or state government, for example, or by the federal government, or by another appropriate entity. For example, a university or private housing complex may limit speeds of electric motorbikes. In one instance, speed levels may be designated by modes, such as modes 1, 2, and 3, with each mode representing a maximum speed.

Figure 2:
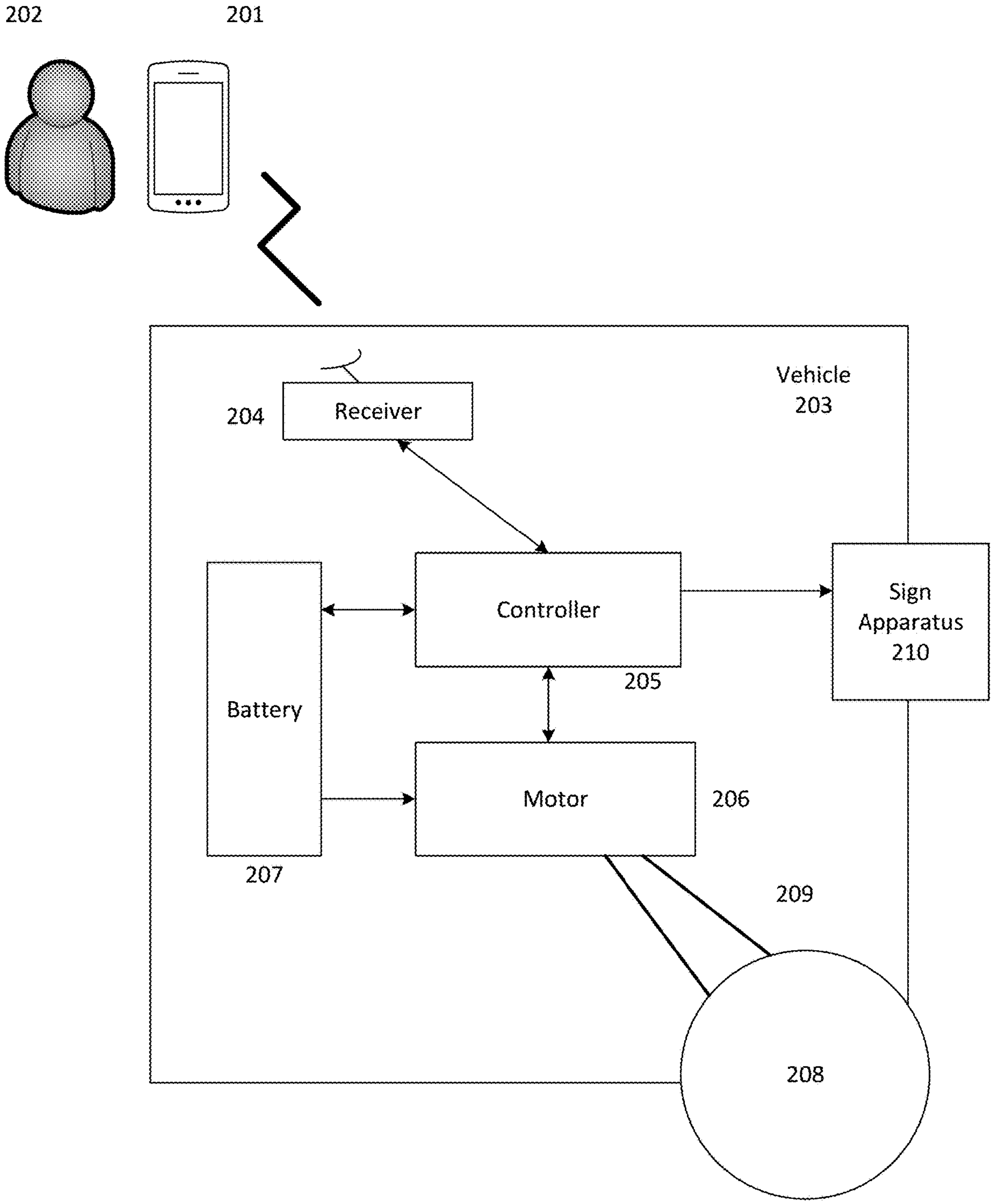
FIG. 2 is a general representation of components in accordance with the present design.

FIG. 2 is a general depiction of the overall system performing in accordance with the present design. From FIG. 2, a computing device 201 maintained by the user 202 is able to receive commands, such as by being loaded with an application, that allows the computing device 201 to transmit a command to the vehicle 203 by appropriate communications means, such as Bluetooth™. The vehicle 203 includes a receiver 204 configured to receive transmissions over the communication channel, again such as Bluetooth™, and convey the command to controller 205. Controller 205 receives the command and is configured to determine the content of the command and provide a signal or signals to control the vehicle appropriately.

In one example, the commands received may be Modes, such as Modes 1, 2, and 3, corresponding to different performance attributes. In one embodiment, Mode 1 represents a first speed limit, Mode 2 a second speed limit, and Mode 3 a third speed limit. Controller 205, upon receiving a command to perform according to Mode 2, for example, compares this command with the available known commands and may, for example, translate this command into a usable value, which may for example be the speed in question, e.g. 25 miles per hour, or may be a voltage or current to apply that would effectuate the desired performance attribute. For example, if a 25 mile per hour speed limit calls for application of N volts to the motor such that the vehicle is restricted to 25 miles per hour on flat ground, the controller provides such a voltage, or up to that voltage, to the motor 206. The battery 207 then applies up to N volts and causes the rear wheel 208 to rotate, such as via a drive belt 209, so that up to 25 miles per hour can be achieved. Alternately, if a current of C amps causes the motor 206 to drive the rear wheel at the desired Mode 2 25 per hour speed, the controller 205 controls the battery 207 to electrically distribute up to C amps to the motor 206, resulting in the rear wheel turning such that the electric motorbike moves up to the allotted 25 miles per hour.

Other performance attributes may be altered in this manner. For example, and not by way of limitation, a person may loan her vehicle to another who is going to travel through a known residential area. The user may employ her computing device to limit the output of a headlight provided with the vehicle, and may if a headlight is to operate in certain areas at a reduced light level to avoid disturbing others, may command the controller to operate at the reduced light level. The appropriate electrical quantity, e.g. voltage or current, is transmitted to the headlight such that the lumens transmitted conform to the quantity or mode selected by the user. Other examples may be employed, including but not limited to power consumption being limited to a certain level, horn volume, and so forth.

Figure 3:
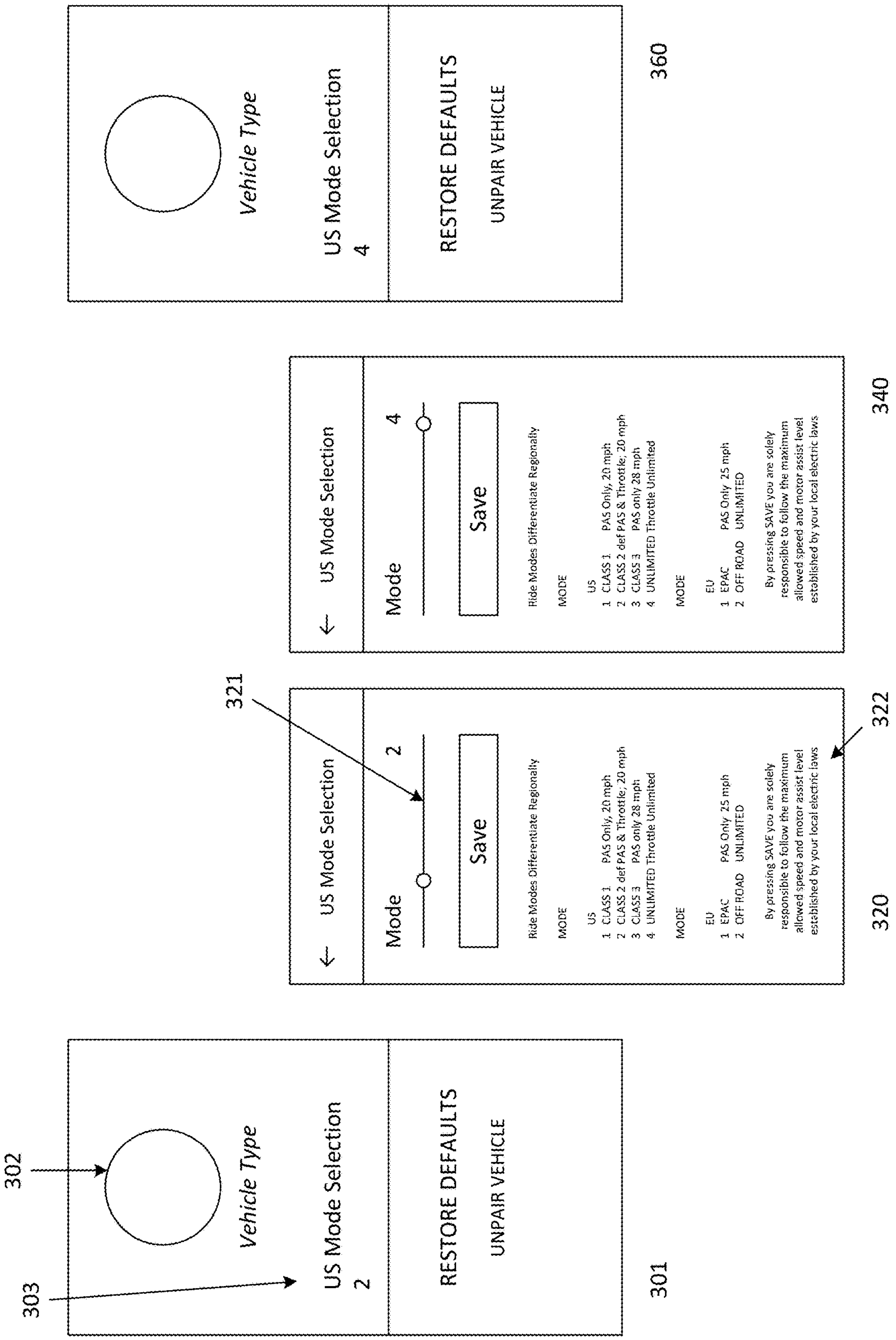
FIG. 3 illustrates screen examples for an implementation on a computing device such as a smartphone.

FIG. 3 is a general arrangement of screens on the user device showing an embodiment of the present design. Screen 301 acknowledges the vehicle type 302 as well as the mode selection, here applicable to the United States at point 303. Other options provided to the user are to restore defaults or unpair the vehicle, i.e. disconnect the communication channel between the computing device or smartphone and vehicle, such as disconnecting or unpairing a Bluetooth™ connection. Screen 320 shows the US Mode selection in this example, including four US modes and two EU modes. Other modes, for other jurisdictions or those shown, can be provided as desired. This particular screen shows a slider 321 currently at Mode or Class 2, where if the user is operating in the US four Modes or Classes are available. Mode or Class 1 is for PAS, or pedal assist system, with a 20 mph maximum speed setting. PAS allows the user to power the electric motor when he or she turns the pedals without the need to press on the throttle. In this Mode 1, the throttle is not available or used. Mode or Class 2 allows PAS and throttle, again with the 20 mph limit. In this rendition, class 2 is the default operating mode. Mode or Class 3 allows PAS only with a 28 mph maximum speed. Mode or Class 4 allows for unlimited speed. A warning 322 may be provided.

In this example, user changes to Mode or Class 4. Screen 340 is presented, and the user may select save, resulting in a change to Mode or Class 4, here unlimited speed. Vehicle menu 360 shows the US Mode Selection, here Mode 4. Limits may be placed on any or multiple modes. For example, and not by way of limitation, the user may be offered an ability to limit PAS speeds and may alternately be offered an ability to limit throttle performance or speed. Alternately, performance inhibiting may include certain switching, such as the inability to operate a switch on the vehicle.

In one embodiment, the text appearing on screen 320 may include:

Ride Modes Differentiate Regionally
MODE
US
1 CLASS 1 PAS Only, 20 mph
2 CLASS 2 def PAS & Throttle; 20 mph
3 CLASS 3 PAS only 28 mph
4 UNLIMITED Throttle Unlimited
MODE
EU
1 EPAC PAS Only, 25 mph
2 OFF ROAD UNLIMITED
By pressing SAVE you are solely responsible to follow the maximum allowed speed and motor assist level established by your local electric laws "def" in the foregoing indicates Mode 2 is the default mode of operation.

Figure 4:
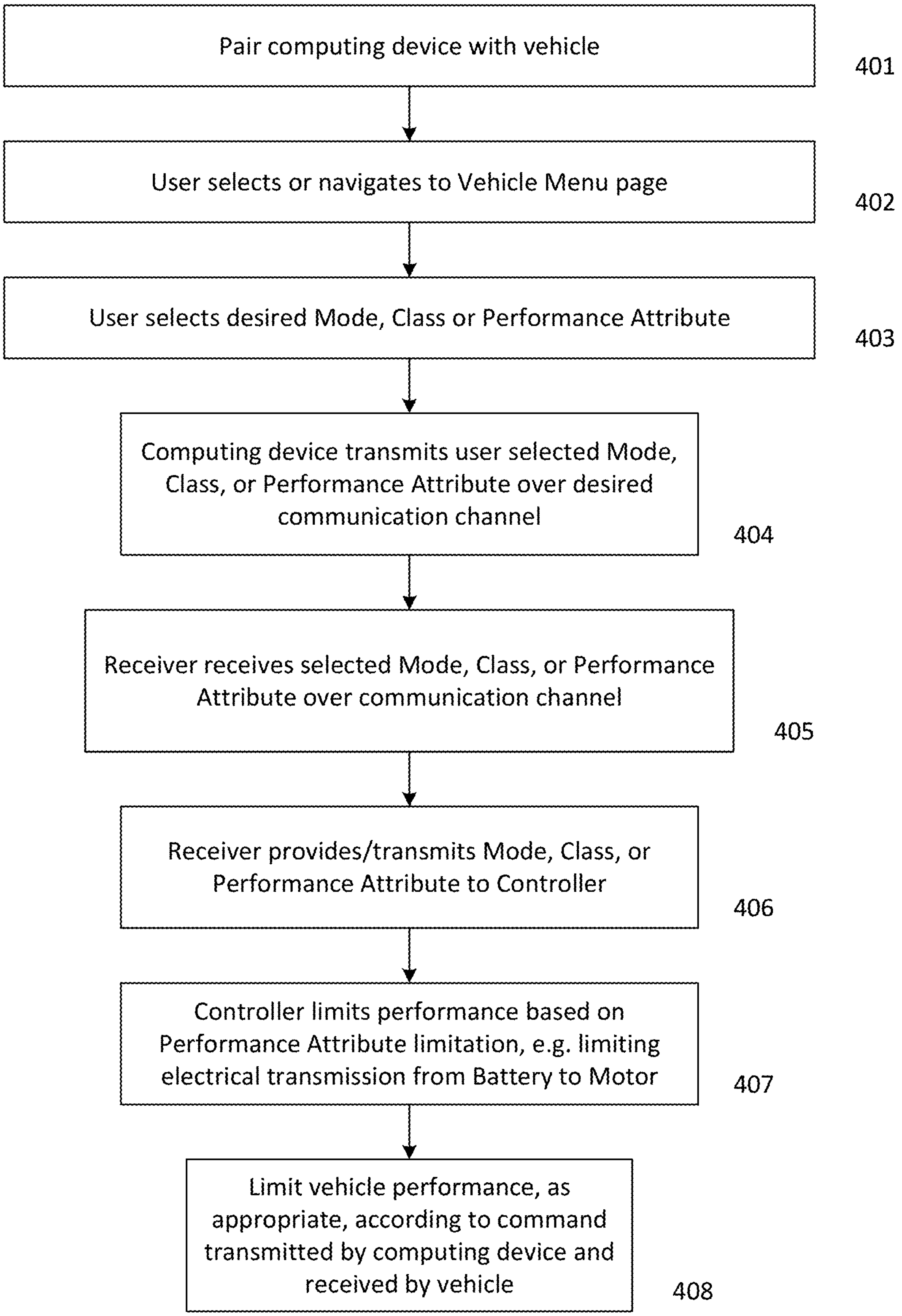
FIG. 4 illustrates operation according to one aspect of the present design.

FIG. 4 illustrates a general overview of one aspect of the present design. From FIG. 4, there is provided point 401 calling for the computing device to pair with the vehicle, where pairing includes establishing a communication channel. Point 402 calls for the user selecting or navigating to an appropriate screen or menu, such as a Vehicle Menu screen. The user may then select the desired Mode, Class, or Performance Attribute at point 403. At point 404, the computing device transmits the user selected Mode, Class, or Performance Attribute over the desired communication channel to the vehicle, such as an electronic motorbike. At point 405, the receiver on the vehicle receives the selected Mode, Class, or Performance Attribute over the communication channel. Point 406 calls for the receiver to provide or transmit information representing the Mode, Class, or Performance Attribute selected to the controller. Point 407 indicates the controller limits performance based on the Performance Attribute limitation, such as limiting the voltage or current provided from the battery to the motor to limit speed of the vehicle. Point 408 represents the actual limitation of performance. As discussed herein, while performance limiting is discussed, it is to be understood that performance allowance may also be provided, such as changing the desired speed limit from 28 mph to unlimited. Performance may be adjusted as desired, and terms such as "limit performance" or "performance limiting" are not intended to be limiting but interpreted broadly.

While described herein as a remote computing device, such as a computing device or smartphone, providing commands to the vehicle, such commands may be provided on the vehicle itself, such as via a switch or selector offered on the vehicle. Other similar functionality may be provided as discussed, such as varying different performance attributes, limiting ability to switch, and so forth. And while an electric motorbike is discussed herein, any type of vehicle may be used in association with the design presented. Further, the limitations offered to the user may vary and may change. For example, a change in jurisdiction K may be from a maximum of unlimited speed to a maximum of 22 miles per hour, unavailable on the vehicle and not required in any other jurisdiction. Such a new requirement may be provided in both the computing device, such as by an app update, and the vehicle, wherein 22 mph may be converted to a voltage or current level applied to the motor by the battery and such a Mode or Class offered on the vehicle via software, firmware, or other applicable mechanism.

A further embodiment of the present design includes an ability to provide signage reflecting applicable performance attributes. The design discussed above provides an ability to employ a single vehicle that conforms to various requirements, such as different speed limiting performance levels, switchable by a user. Certain jurisdictions, however, require signage on the vehicle disclosing certain information, including performance attributes. A simple, single speed electric motorbike, for example, may include a sign that indicates its maximum speed limit is 25 miles per hour, typically in the form of a sticker or placard bearing the performance attribute. When a user alters this performance capability according to the design presented, the signage must accurately reflect the new performance attribute value.

FIG. 2 illustrates a sign apparatus 210, which may be a digital or analog sign apparatus and may be any hardware or apparatus that can display information, including but not limited to electrophoretic, LED, LCD, and/or OLED displays. Sign apparatus 210 receives Mode or Class change information from controller 205 and displays the required information. While a Mode or Class change may be provided or requested, the need for display of such a change may not be necessary. For example, if a lower level of light from a headlight is commanded, such lower operation may not need to be displayed using sign apparatus 210. The sign apparatus 210 may be located at any reasonable and available location on the vehicle, and may have more functionality than mere signage, such as being part of a speedometer or odometer display that the user may view. The sign apparatus 210 may be positioned on the handlebars in front of the vehicle user, for example.

In one embodiment, the sign apparatus 210 is always operational, or always on such that the displayed information can always be reviewed by an observer. When part of a display that includes other information, the signage text or indications are always operable. Internal power may be provided from the vehicle battery or a separate power source may be supplied such that the indications are always available. Total power loss may occur, but in normal operation the signage is always available once power has been restored.

Figure 5:
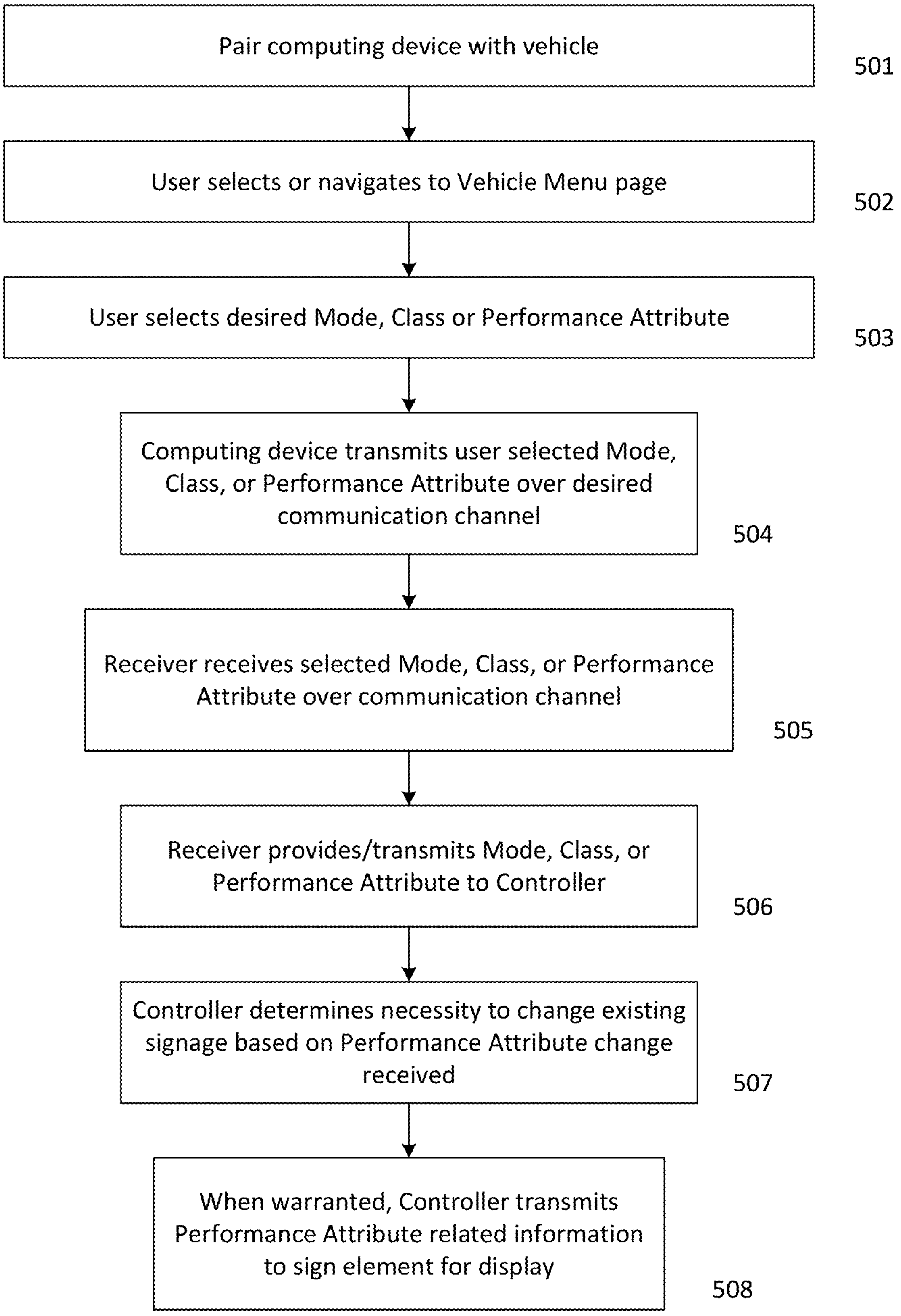
FIG. 5 illustrates operation according to a second aspect of the present design.

FIG. 5 illustrates operation of the signage element of the present design. From FIG. 5, point 501 calls for the computing device to pair with the vehicle, where pairing includes establishing a communication channel. Point 502 indicates the user selects or navigates to an appropriate screen or menu, such as a Vehicle Menu screen. The user may then select the desired Mode, Class, or Performance Attribute at point 503. At point 504, the computing device transmits the user selected Mode, Class, or Performance Attribute over the desired communication channel to the vehicle, such as an electronic motorbike. At point 505, the receiver on the vehicle receives the selected Mode, Class, or Performance Attribute over the communication channel Point 506 calls for the receiver to provide or transmit information representing the Mode, Class, or Performance Attribute selected to the controller. Point 507 indicates the controller determines the necessity to change the existing signage based on the Mode, Class, or Performance Attribute change received. As noted, in some instances a desired Mode, Class, or Performance Attribute change may not require a signage change. Point 408 calls for changing the information displayed on the sign apparatus. At point 408, when warranted, the controller transmits Performance Attribute related information to the sign apparatus for display, e.g. a speed limit of 28 mph. While performance limiting is discussed, it is to be understood that performance enabling may also be provided, such as changing the desired speed limit from 28 mph to unlimited.

Thus according to one embodiment, there is provided a vehicle system comprising a computing device configured to transmit a vehicle performance alteration command and a vehicle, comprising a receiver configured to receive the vehicle performance alteration command and a controller configured to receive the vehicle performance alteration command from the receiver and alter at least one electrical performance attribute of one electrically powered hardware component provided with the vehicle to cause the vehicle to perform in accordance with the vehicle performance alteration command.

According to another embodiment, there is provided a vehicle comprising a receiver configured to receive a vehicle performance alteration command from a computing device, a controller configured to receive the vehicle performance alteration command from the receiver and provide a performance altering command, a power source configured to receive the performance altering command from the controller, and an electrically driven hardware element configured to receive electrical power from the power source. The controller is configured to alter operation of the power source to effectuate vehicle performance in accordance with the vehicle performance alteration command.

According to a further embodiment, there is provided a vehicle comprising a receiver configured to receive a vehicle performance alteration command, a controller configured to receive the vehicle performance alteration command from the receiver and provide a performance altering command, a power source configured to receive the performance altering command from the controller, and an electrically driven hardware element configured to receive electrical power from the power source. The controller is configured to alter operation of the power source to alter a maximum level of vehicle performance in accordance with the vehicle performance alteration command.

The foregoing description of specific embodiments reveals the general nature of the disclosure sufficiently that others can, by applying current knowledge, readily modify and/or adapt the system and method for various applications without departing from the general concept. Therefore, such adaptations and modifications are within the meaning and range of equivalents of the disclosed embodiments. The phraseology or terminology employed herein is for the purpose of description and not of limitation.

What is claimed is:

1. A vehicle system comprising:

a computing device configured to transmit a vehicle performance alteration command, wherein the vehicle performance alteration command comprises a command to operate according to a predetermined speed limit mode selectable by a user-from a plurality of different predetermined operational modes displayed to the user together on a single viewable area comprising:

a pedal assist mode enabling the user to provide electric power using pedals;

an unlimited speed mode enabling the user to employ electric power without restriction; and at least one predetermined operational mode corresponding to one vehicle speed limit within one jurisdiction; and a vehicle, comprising:

a controller configured to receive the vehicle performance alteration command and alter at least one electrical performance attribute of one electrically powered hardware component provided with the vehicle;

wherein the controller controls an electrical power source to limit electrical output provided to the one electrically powered hardware component to a level whereby the vehicle cannot be powered to operate at a speed above any maximum speed limit associated with a selected operational mode.

2. The vehicle system of claim 1, wherein the vehicle comprises an electric motorbike and the electrically powered hardware component comprises an electric motor that drives a wheel of the electric motorbike.

3. The vehicle system of claim 2, wherein the computing device is configured to transmit a plurality of performance alteration commands comprising commands to operate at a corresponding plurality of jurisdiction based predetermined speed limits.

4. The vehicle system of claim 1, wherein controlling the electrical power source comprises altering one of voltage and current to achieve a level corresponding to the vehicle performance alteration command.

5. The vehicle system of claim 1, wherein the vehicle performance alteration command comprises a command to establish a maximum speed for the vehicle available within a predetermined specific jurisdiction.

6. The vehicle system of claim 1, wherein the vehicle performance alteration command comprises a desired performance class or a desired performance mode.

7. The vehicle system of claim 1, wherein the computing device comprises a smartphone and the smartphone transmits the vehicle performance alteration command over a wireless communication channel.

8. A vehicle comprising:

a computing device configured to receive a vehicle performance alteration command comprising a command to operate according to a predetermined speed limit mode selectable by a user from a plurality of predetermined operational modes displayed to the user together on a single viewable area comprising:

a pedal assist mode enabling the user to provide electric power using pedals;

an unlimited speed mode enabling the user to employ electric power without restriction; and at least one predetermined operational mode corresponding to one vehicle speed limit within one jurisdiction;

a controller configured to receive the vehicle performance alteration command and provide a performance altering command;

a power source configured to provide electrical power in accordance with the performance altering command; and an electrically driven hardware element configured to receive electrical power from the power source;

wherein the controller is configured to limit electrical output from the power source to the electrically driven hardware element to a level such that the vehicle cannot be powered to operate at a speed greater than any jurisdiction based predetermined speed limit associated with one user selected predetermined operational mode.

9. The vehicle of claim 8, wherein the vehicle comprises an electric motorbike and the electrically driven hardware element comprises an electric motor that drives a wheel of the electric motorbike.

10. The vehicle of claim 9, wherein the controller alters one of voltage and current provided by the power source to the electric motor.

11. The vehicle of claim 8, wherein the computing device is configured to transmit a plurality of performance alteration commands comprising commands to operate at a corresponding plurality of jurisdiction based predetermined speed limits.

12. The vehicle of claim 8, wherein the vehicle performance alteration command comprises a desired performance class or a desired performance mode.

13. The vehicle of claim 12, wherein the controller converts the desired performance class or the desired performance mode into an electrical level at which the power source provides electrical power.

14. The vehicle of claim 8, wherein the vehicle receives the vehicle performance alteration command from a smartphone over a wireless communication channel.

15. A vehicle comprising:

a computing device configured to receive a vehicle performance alteration command comprising a command to operate according to a jurisdiction based predetermined speed limit mode selectable by a user from a plurality of predetermined operational modes displayed to the user together on a single viewable area comprising:

a pedal assist mode enabling the user to provide electric power using pedals;

an unlimited speed mode enabling the user to employ electric power without restriction; and at least one predetermined operational mode corresponding to one vehicle speed limit within one jurisdiction;

a controller configured to receive the vehicle performance alteration command and provide a performance altering command;

a power source configured to provide electrical power in accordance with the performance altering command; and an electrically driven hardware element configured to receive electrical power from the power source;

wherein the controller is configured to limit electrical output from the power source to the electrically driven hardware element to a level such that the vehicle cannot be powered to operate at any speed greater than the jurisdiction based predetermined speed limit associated with one user selected predetermined operational mode.

16. The vehicle of claim 15, wherein the vehicle comprises an electric motorbike and the electrically driven hardware element comprises an electric motor used to drive a wheel of the electric motorbike.

17. The vehicle of claim 16, wherein the controller alters one of voltage and current provided by the power source to the electric motor.

18. The vehicle of claim 15, wherein the computing device is configured to receive a plurality of performance alteration commands and transmit any of the plurality of performance alteration commands to the controller, the plurality of performance alteration commands comprising commands to operate at a corresponding plurality of jurisdiction based predetermined speed limits.

19. The vehicle of claim 15, wherein the vehicle performance alteration command comprises a desired performance class or a desired performance mode.

20. The vehicle of claim 19, wherein the controller converts the desired performance class or the desired performance mode into an electrical level at which the power source provides electrical power.

* * * * *